Feb. 14, 1939.  W. N. GLAB  2,147,026
COUPLING
Filed March 29, 1937
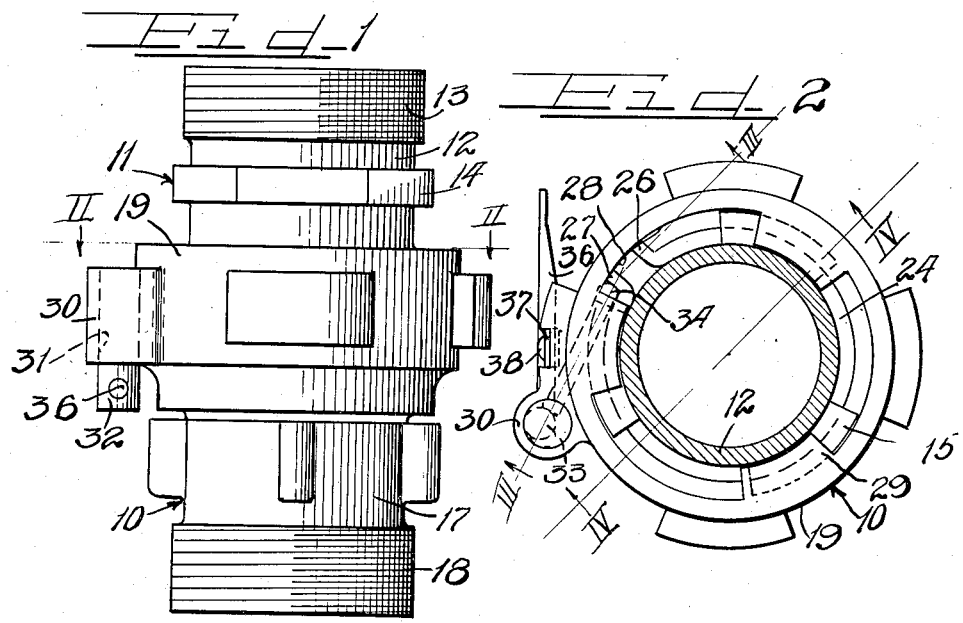
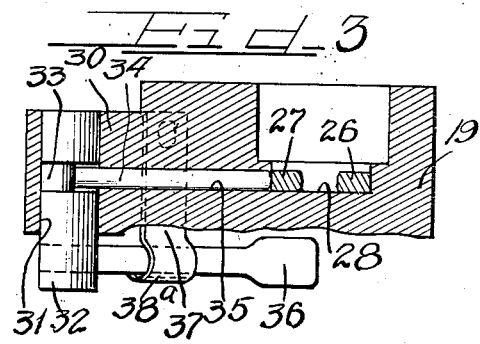
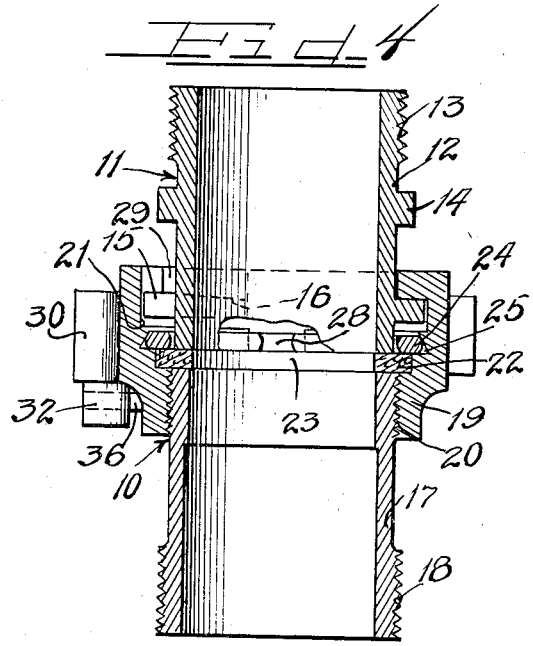
Inventor
William N. Glab
by Charles N. Hill
Attys.

Patented Feb. 14, 1939

2,147,026

UNITED STATES PATENT OFFICE 2,147,026

COUPLING

William N. Glab, Dubuque, Iowa, assignor to Morrison Brothers Company, Dubuque, Iowa, a corporation of Iowa Application March 29, 1937, Serial No. 133,516

4 Claims. (Cl. 285—175)

The present invention relates in general to an improved coupling, and is more specifically concerned with improved locking means for securing the coupling members against disconnection by becoming loosened due to jarring, vibration and the like.

It has been found desirable in connection with fluid handling equipment, as in the handling of hydrocarbon fluids, to utilize couplings, filler caps, etc., which may be quickly detached and attached. For this purpose, a very desirable arrangement for interconnecting the parts of the devices has consisted in the use of tongue portions on the parts to be connected, which would be moved into overlapping engagement. By providing the tongues on one of the elements with a cam surface, the elements could be actuated into tight engagement by relative rotative movement.

While this type of arrangement proved very satisfactory where there was no jarring or vibration imposed upon the device, it was found that the parts sometimes jarred loose and became disconnected, with the result that considerable inconvenience might be experienced, and under certain conditions there might be a loss of fluid due to a hose becoming disconnected from a faucet or a hose line becoming opened.

With a view to overcoming such possibility and in an endeavor to secure the parts of the coupling, filler cap or other similar device in connected relation, the elements are so connected that they will not be jarred loose and in such a way that when it is desired to disconnect the elements, they can be readily and easily moved to proper position for disconnection.

It is therefore a primary object of the present invention to provide an improved coupling having novel means for securing the coupling parts against inadvertent movement to a position wherein the parts may be uncoupled.

A further object is to provide a coupling of the herein described type having a simple locking mechanism which may be actuated from the exterior of the coupling members, which may be manufactured at low cost, and which will operate in an efficient manner to positively maintain the coupling parts in connected position, but when desired may be easily actuated to permit movement of the coupling parts to proper position for enabling their disconnection.

Although, for purposes of illustration, the present invention has been described in connection with a coupling, it will be readily apparent to one skilled in the art that the invention may with equal facility be used for securing dust caps, filler caps and other similar devices in operative position.

Other objects and features of the invention will more fully appear from the following detailed description, taken in connection with the accompanying drawing which illustrates a preferred embodiment thereof, and in which:

Figure 1 is a view in elevation showing the coupling of the present invention with its parts in connected relation;

Figure 2 is a transverse sectional view to clearly show the operative relationship of the connecting instrumentalities, taken substantially on the line II—II of Figure 1;

Figure 3 is a fragmentary sectional view, showing the details of the locking mechanism, taken substantially on the line III—III of Figure 2; and Figure 4 is a longitudinal section through the coupling, taken substantially on the line IV—IV of Figure 2.

As shown on the drawing:

In the illustrated embodiment of the present invention, the device is disclosed as being composed of a female assembly generally indicated at 10 and a male member generally indicated at 11, these members being adapted to be associated with each other and connected together to form a continuous conduit or passageway. Although, in the illustrated embodiment, the invention has been applied to a coupling, it will be evident that the male member, for example, might comprise a faucet spout and a hose might be connected through the agency of the female member to the faucet or, in another arrangement, the male member might comprise a filling connection to a tank, and the female member constructed in the form of a removable cap for connection thereto.

The male member, in this instance, comprises a tube 12 which may be threaded at one end, as shown at 13, to permit its being connected to a conduit by means of a suitable union or other connection device. To facilitate tightening of the connection, the tube is provided intermediate its ends with a polygonal portion 14 which facilitates the application of a tool thereto. Slightly spaced from the other end of the tube are spaced projections 15 which form a series of substantially circumferentially aligned tongues. The uppermost surfaces of these tongues, as shown in Figure 4, are inclined to form cam surfaces 16.

The female assembly likewise includes a tube 17 which may be similarly arranged at one end for threaded connection, the thread being shown at 18, whereby the tubular member may be connected by means of a suitable union or other device to a conduit. The opposite end of the tubular member 17 has swively mounted thereon a sleeve 19. The sleeve may be connected to the tubular member in any suitable manner, although it has been found very satisfactory to make this connection by means of a tongue and groove connection, as shown at 20.

The sleeve 19 is of sufficient width to project past the end of the tubular member 17 and is cut out or otherwise formed as shown at 21 so as to have an internal diameter greater than the outside diameter of the male member, whereby the male member may be inserted within the sleeve. Intermediate its ends, the sleeve is provided with an internal groove 22 which cooperates with the associated end of the tubular member 17 to form a seat for a gasket 23 of leather or other suitable gasket material. This gasket is retained in seated position by means of a split ring 24 of resilient material, which is disposed in a retaining groove 25 and extends outwardly over the gasket to hold it in seated position.

The ends of the split ring 24 are outwardly deflected, as shown at 26 and 27, these ends being disposed in a recess portion 28 of the sleeve wall. The inside diameter of this ring is sufficiently large to enable the end of the male member to be inserted therethrough and engage against the gasket 23, as shown in Figure 4.

For cooperating with the tongues 15 on the male member, the sleeve is provided with a plurality of spaced inwardly extending projections 29 which will overlie the tongues 15 when the male member is inserted into the sleeve. During the insertion of the male member, the tongues 15 may pass through the spaces between the projections 29, and by rotating the sleeve these projections are moved over the cam surfaces 16 of the tongues with the result that the male member is forced in an axial direction against the gasket. When it is desired to disconnect the male and female members, the sleeve may be rotated in the opposite direction until the tongues 15 are again positioned in the spaces between the projections 29, whereupon the male and female members may be readily separated.

It has been found that under certain conditions of installation, particularly where the coupling is subjected to jarring or vibration, the tongues and projections may be moved to their relative positions which permit disconnection of the coupling elements. It is therefore apparent that the coupling may become disconnected under these conditions and cause loss of fluid or result in damage to the surrounding property.

In order to overcome the possibility of such a condition, the coupling is provided with a novel locking mechanism which makes use of the retaining ring 24, by means of which this ring is caused to be contracted so as to grippingly engage the associated end of the male member and thus prevent movement of the coupling parts to disconnected position as a result of vibration, jarring, etc.

For this purpose, the sleeve 19 is provided with a projecting portion 30 which is apertured as shown at 31 to receive therein and rotatably mount a short shaft 32. This shaft is axially aligned with the center line of the sleeve and is provided with a contracted portion 33 having its axis offset relative to the main axis of the shaft, so as to form a cam surface. This contracted portion is associated with a right angularly disposed rod member 34 which is supported for reciprocable movement in a suitable bored passageway 35 of the sleeve wall. One end of the member 34 is in abutment with the contracted portion 33 and the opposite end is in engagement with the deflected end 27 of the split ring.

The shaft 32 projects from its support at one end and is provided with a right angularly extending lever 36, by means of which the shaft may be rotated in opposite directions. Rotation of the shaft 32 by means of the lever in the proper direction will move the contracted portion in such a manner as to push the rod member 34 towards the ring end 27, and due to this action, the end 27 will be moved towards the end 26 of the ring. It will be evident that with this relative movement of the ends 26 and 27 of the ring, the ring will be contracted and grip the associated end of the male member and thus hold the male member and sleeve against relative rotational movement.

Moreover, in the actuation of the locking mechanism just described to locking position, it will be noted that as the ring 24 is contracted, it at first begins to grip the male member adjacent the end 26 thereof, and as the ring is further contracted, the gripping contact is increased towards the other end of the ring. Due to the fact that the end 27 of the ring is being moved towards the end 26 of the ring, this latter end being retained against movement, there may be a slight rotational movement of the male member. This movement is such, however, in its relation to the female member as to result in more tightly securing the coupled members in secured together relation. In other words, the locking operation does not tend to loosen the coupling connection, but operates to tighten the coupling connection.

It has been found desirable, when the lever 36 is not in such position as to cause the ring to grip the male member, to provide some means for latching the lever at its limit of movement and thus hold it out of the way so as not to interfere with the handling of the female part of the coupling when the coupling parts are being connected or disconnected.

For this purpose, a leaf spring 37 is supported on the exterior of the sleeve 19. One end of the spring is anchored to the sleeve wall in any suitable manner, as by means of a screw 38. The free end of this spring is curved, as shown at 38a, this curved portion being so positioned as to be in the line of movement of the shank of the lever 36 and resiliently engage the shank when the lever is moved against the spring.

In order to release the split ring from its clamping engagement with the inserted end of the male member, it is only necessary to move the lever from its limit position away from the spring 37 to its limit position wherein it is engaged by the spring 37, as shown in Figure 3. Since the ring is constructed of resilient material, the ends 26 and 27 of the ring will be forced apart so as to release the ring grip on the associated end of the male member.

Should it then be desired to disconnect the coupling, it is only necessary to relatively rotate the sleeve to such position that the tongues 15 will be disposed between the projections 29, whereupon the male member may be withdrawn from the female member.

From the foregoing description, it will be apparent that the present invention provides an improved coupling which contains novel means for securing the coupling parts against movement to a position wherein the parts may be uncoupled; and in which the improved locking mechanism may be actuated from the exterior of the coupling member; which is simple in construction, has low manufacturing cost, and operates in an efficient manner.

It is, of course, to be understood that although I have described in detail a single embodiment of my invention, the invention is not to be thus limited, but only insofar as defined by the scope and spirit of the appended claims.

I claim as my invention:

1. A liquid tight coupling comprising a first tubular member, a sleeve swivelly mounted on one end of said member, an annular gasket disposed over the end of said member, a split ring of expansible material for retaining said gasket in position, a second tubular member having an end adapted to be disposed within said ring and in abutment with said gasket, cam means operative in response to relative rotation of said sleeve in one direction for forcing said tubular members axially against said gasket and securing them against axial movement in the opposite direction, and means operable from the exterior of said coupling for contracting said split ring to grip the associated end of the second member.

2. Means for locking a pair of coupling members together, said means comprising a normally expanded split ring of resilient material carried by one of said members and anchored at one end thereto, said ring being adapted to surround the other of said members, a push rod reciprocably mounted in said one of said members with one end in pushing engagement with the free end of said ring, and a lever actuated cam member associated with the other end of said rod, whereby the rod may be pushed in a direction to contract the ring.

3. A liquid tight coupling comprising a first tubular member, a sleeve swivelly mounted on one end of said member, an annular gasket disposed over the end of said member with one of its faces exposed, a split ring of expansible material for retaining said gasket in position, said split ring being removably supported in abutting relation with the exposed face of said gasket, a second tubular member having an end adapted to be disposed within said ring and in abutment with said gasket, cam means operative in response to relative rotation of said sleeve in one direction for forcing said tubular members axially against said gasket and securing them against axial movement in the opposite direction, said split ring being disposed between said gasket and cam means, and means operable from the exterior of said coupling for contracting said split ring to grip the associated end on the second member.

4. A liquid tight coupling comprising a tubular female member having an internal groove, a gasket seated in said groove, a second groove adjacent the exposed face of said gasket, an expansible split ring in said second groove for normally retaining said gasket in the groove, said second groove having an inclined bottom, whereby expansion of the split ring acts to move it into engagement with the exposed face of the gasket, a male member having an end insertible into the female member into abutment with the exposed face of said gasket and surrounded by said ring, and means operable from the exterior of said coupling for contracting the ring into gripping relation with the inserted end of the male member.

WILLIAM N. GLAB.